United States Patent
Kafka et al.

(10) Patent No.: US 7,899,063 B2
(45) Date of Patent: Mar. 1, 2011

(54) SYSTEM AND METHOD FOR PROVIDING SERVICES THROUGH AN INTEGRATED DIGITAL NETWORK

(75) Inventors: Henry J. Kafka, Atlanta, GA (US); Alan Blackburn, Woodstock, GA (US); James W. Rembert, Atlanta, GA (US); Thomas A. Anshutz, Conyers, GA (US); Randy Corn, Beech Mountain, NC (US)

(73) Assignee: AT&T Intellectual Property I, LP, Reno, NV (US)

( * ) Notice: Subject to any disclaimer, the term of this patent is extended or adjusted under 35 U.S.C. 154(b) by 0 days.

(21) Appl. No.: 12/251,105

(22) Filed: Oct. 14, 2008

(65) Prior Publication Data

US 2009/0103546 A1    Apr. 23, 2009

Related U.S. Application Data

(63) Continuation of application No. 09/974,109, filed on Oct. 9, 2001, now Pat. No. 7,436,839.

(60) Provisional application No. 60/239,335, filed on Oct. 9, 2000.

(51) Int. Cl.
*H04L 12/28* (2006.01)

(52) U.S. Cl. ............... 370/395.5; 370/493; 370/392; 370/356

(58) Field of Classification Search ............ 370/493, 370/392, 356, 352, 395.5
See application file for complete search history.

(56) References Cited

U.S. PATENT DOCUMENTS

| | | | |
|---|---|---|---|
| 6,392,999 B1 * | 5/2002 | Liu et al. ............... | 370/260 |
| 6,470,010 B1 | 10/2002 | Szviatovszki et al. | |
| 6,490,451 B1 * | 12/2002 | Denman et al. ............... | 455/436 |
| 6,522,627 B1 * | 2/2003 | Mauger ............... | 370/230 |
| 6,522,629 B1 * | 2/2003 | Anderson, Sr. ............... | 370/236 |
| 6,556,659 B1 | 4/2003 | Bowman-Amuah | |
| 6,611,532 B1 * | 8/2003 | Madour et al. ............... | 370/466 |
| 6,614,781 B1 * | 9/2003 | Elliott et al. ............... | 370/352 |
| 6,640,239 B1 * | 10/2003 | Gidwani ............... | 709/203 |
| 6,678,264 B1 * | 1/2004 | Gibson ............... | 370/352 |
| 6,680,943 B1 * | 1/2004 | Gibson et al. ............... | 370/392 |
| 6,680,952 B1 | 1/2004 | Berg et al. | |
| 6,687,245 B2 * | 2/2004 | Fangman et al. ............... | 370/356 |
| 6,689,652 B2 | 2/2004 | Morizuka | |
| 6,704,287 B1 | 3/2004 | Moharram | |

(Continued)

OTHER PUBLICATIONS

V. Nirkhe et al., "Quality of Service Support for Networked Media Players",1995, pp. 234-238, IEEE.

(Continued)

*Primary Examiner* — Ayaz R Sheikh
*Assistant Examiner* — Andrew C Lee
(74) *Attorney, Agent, or Firm* — Cantor Colburn LLP

(57) ABSTRACT

A system and methods for providing services through an integrated digital network. The present invention embodies a system and methods for providing telecommunications services through an integrated digital network that provides the superset of all previous network types, and can continue to support being the core for existing networks—now used simply as edge access methods. The method includes connecting a multi-service core to existing telecommunications networks, wherein the core can communicate with conventional network components; interconnecting a gateway between the multi-service core and multiple existing network components, wherein the gateway is configured to share multiple service aspects with each network component and to utilize multiple transport protocols to communicate with different core network components; coordinating communications between the gateway and existing network components; and resolving differences between protocols or communications between existing core network components.

20 Claims, 4 Drawing Sheets

U.S. PATENT DOCUMENTS

| | | | |
|---|---|---|---|
| 6,714,987 B1 * | 3/2004 | Amin et al. | 709/249 |
| 6,724,801 B1 * | 4/2004 | Sylvain | 370/352 |
| 6,765,903 B1 | 7/2004 | Allen, Jr. et al. | |
| 6,765,921 B1 * | 7/2004 | Stacey et al. | 370/401 |
| 6,778,494 B1 * | 8/2004 | Mauger | 370/230 |
| 6,856,676 B1 * | 2/2005 | Pirot et al. | 379/201.01 |
| 7,023,860 B1 * | 4/2006 | Mauger | 370/401 |
| 7,103,008 B2 | 9/2006 | Greenblat et al. | |
| 7,120,139 B1 | 10/2006 | Kung et al. | |
| 2001/0018711 A1 * | 8/2001 | Morris | 709/229 |
| 2002/0097747 A1 * | 7/2002 | Kirkby et al. | 370/468 |
| 2002/0181462 A1 | 12/2002 | Surdila et al. | |
| 2002/0191250 A1 | 12/2002 | Graves et al. | |
| 2002/0199203 A1 | 12/2002 | Duffy et al. | |

OTHER PUBLICATIONS

A. Grilo et al., "VTOA/VoIP/ISDN Telephony Gateway", 1999, pp. 230-235, IEEE.

* cited by examiner

SYSTEM AND METHOD FOR PROVIDING SERVICES THROUGH AN INTEGRATED DIGITAL NETWORK

CROSS-REFERENCE TO RELATED APPLICATIONS

This application is a continuation of U.S. patent application Ser. No. 09/974,109 filed Oct. 9, 2001, the contents of which are incorporated by reference herein in their entirety, which claims priority from U.S. Provisional Application No. 60/239,335, filed Oct. 9, 2000, the entire contents of which are herein incorporated by reference.

FIELD OF THE INVENTION

The present invention relates in general to telecommunications, and relates more particularly to a system and methods for providing services through an integrated digital network.

BACKGROUND OF THE INVENTION

Traditionally, telecommunications service providers built and managed separate networks for providing disparate network-based services. For example, there is a time-division-multiplexed (TDM) network that supports voice telephony. Furthermore, there is a separate Frame Relay network that supports packet data service. In addition, there are other flavors of packet networking, including X.25, Ethernet, ATM, and IP. In the typical telecommunications service provider, these separate networks and their services are supported by separate management and control functions, work centers, and customer support systems. The telecommunications service providers and their respective networks rarely share more than a common use of SONET transport facilities.

One significant development in the telecommunications industry is the convergence of voice and data networks. Given that voice is transmitted digitally in modern telecommunications networks, it has been discovered that voice and data services can be provided using the same network. There are various ATM and Voice-over-IP incarnations of this approach. In addition, many telecommunications service providers have made use of ATM networks to deliver both ATM and Frame Relay Services.

Some attempts have been made to converge networks to provide voice and date services. For example, digital subscriber line (DSL) service permits users at home to receive or transmit simultaneous voice, data, and video channels to others via the Internet. In another example, cable modem service permits users at home to receive or transmit simultaneous voice, data, and video channels to others via the Internet. These types of access lines can carry a variety of broadband services from the network to users, however, sometimes, the bandwidth and transmission capabilities of access lines are not fully realized.

One drawback of conventional telecommunications systems is that conventional IP networks do not provide sufficient capabilities for secure, Quality of Service (QoS) enabled communications that are available today using connection-oriented networks. For example, networks such as TDM, SONET, and ATM, do provide both high-quality and secure communications. Unfortunately, these networks do not provide connectionless network capabilities to support the flexibility and features necessary for a variety of applications desired by a user at home, at work, or transacting business via mobile access to the network. Especially missing is the capability to provide different QoS treatment to a data flow on a packet-by-packet basis.

Furthermore, conventional telecommunications systems can be difficult to upgrade if increased bandwidth and transmission capabilities are desired. Many conventional networks are "core-based". That is, essential programming required to operate the network is centralized in a core switch or set of switches. Upgrading the "core" can mean the entire replacement of the core switch or set of switches. Sometimes, in order to upgrade bandwidth capacity and/or transmission capabilities, expensive and complex networking equipment must be replaced throughout the network. The ultimate replacement of this equipment can take many months or years to accomplish, with disruptions in service, and in quality of service.

Finally, advances in intelligent programming of conventional telecommunications systems are creating opportunities for providing additional services and applications for users. For example, secure, QoS (quality of service) and CoS (class of service)-enabled communications are limited to users of conventional networks. Applying these applications to different types of networks creates inconsistent requirements for quality of service and have prevented the emergence of easy-to-understand business models for selling QoS-enabled networking.

Therefore, there is a need for a system and methods for providing telecommunications services through an integrated digital network.

There is a need for a system and methods for providing telecommunications services through an integrated digital network that provides the superset of all previous network types, and can continue to support being the core for existing networks—now used simply as edge access methods.

There is a further need for a system and methods for configuring an existing telecommunications network into an integrated digital network.

Finally, there is a need for a system and methods for configuring a telecommunications network for delivering service applications in a way that is quality, security, and content aware to network users.

SUMMARY OF THE INVENTION

The present invention embodies a system and methods for providing telecommunications services through an Integrated Digital Network (IDN), Furthermore, the present invention embodies a system and methods for providing telecommunications services through an integrated digital network that provides the superset of all previous network types, and can continue to support being the core for existing networks—now used simply as edge access methods. Furthermore, the present invention embodies a system and methods for configuring an existing telecommunications network into an IDN. The present invention also embodies a system and methods for reusing existing network components and converting an existing network or set of networks into an IDN or meta-network. Finally, the present invention embodies a system and methods for configuring an IDN for delivering service applications to network users.

The present invention embodies a system and methods for combining the benefits of both "Connection-oriented" as well as "Connectionless" networks. Furthermore, the present invention embodies a system and methods for providing a single, simplified, high-level network control plane. Such a control plane allows scaling through the use of well established Internet-inspired mechanisms, such as a OSPF (Open Shortest Path First) and BGP (Border Gateway Protocol); yet allows for predictable traffic engineering of provisioned network links. Moreover, the present invention leverages the near-ubiquitous reach of IP addressing for the core and management. The present invention also embodies a system and methods for continuing to provide network services that were provided by its predecessor networks including frame relay, IP, ATM, and Ethernet; yet adapting to new services such as lambda switching and GMPLS (Generalized Multiprotocol Label Switching). The present invention also embodies a system and methods for providing both the QoS and security functions of predecessor networks as well as new, network-independent QoS and security functions that are defined by the needs of applications that use the network. The present invention also embodies a system and methods for providing a capability for the aforementioned applications to request various QoS and Security communications services of the network. Furthermore, the present invention also embodies a system and methods for providing a Service Gateway function that raises the intelligence and awareness of the network to affect the delivery of communications based on the context and content of those communications. The present invention also embodies a system and methods for providing a vehicle for delivering application-related services independently of any given network type—but still supporting the appropriate QoS and security required by the application. Finally, the present invention embodies a system and methods for providing a communications session concept, controlled using paradigms developed in the PSTN, but applied to diverse network types and elements where such concepts have not existed.

In one aspect of the invention, the invention provides a method for converging multiple existing telecommunications networks, each including conventional network components, into an integrated digital network such that the integrated digital network can provide common network service applications to multiple users. First, a multi-service core connects to existing telecommunications networks, wherein the core can communicate with conventional network components. Next, a gateway interconnects between the multi-service core and multiple existing network components, wherein the gateway is configured to share multiple service aspects with each network component and to utilize multiple transport protocols to communicate with different core network components. Communications between the gateway and existing network components is coordinated among peers through the common core network, and also among various access methods and networks to adapt them to the service set of the integrated digital network. The service gateway also acts upon the network communications in a way that allows interwork disparate access, QoS, and security types, as well as coordination with the communications control complex to administer the establishment, coordination, cooperation, and billing relationships that will govern the communications session. Differences between protocols or communications between existing core network components are also resolved.

In another aspect of the invention, the invention provides a system for providing network services to multiple network users through an integrated digital network comprising multiple existing telecommunications networks, each including conventional network components. The system includes a multi-service core with shared service aspects of an associated gateway. The system also includes at least one service gateway interconnected to existing core network components such that one or more existing telecommunications networks can exchange communications, wherein the gateway is configured to provide shared service aspects with each telecommunication network; utilize multiple transport protocols to communicate with conventional network components of different telecommunications networks; coordinate communications between conventional network components of different telecommunications networks; and resolve differences between protocols or communications between conventional network components of different telecommunications networks.

This application claims priority from U.S. Provisional Application No. 60/979,162, filed Oct. 11, 2007, the entire contents of which are herein incorporated by reference.

The present invention embodies a system and methods for merging more than just voice and data and more than just ATM and Frame Relay. The present invention embodies a system and methods for architecting a conventional network of a telecommunications service provider so that a single meta-network provides the ability to serve customers many or all of the legacy telecommunications network types such as TDM, Frame Relay, ATM, Ethernet, IP, X.25, and even Dial-access (PPP) and Voice. Key attributes of the traditional PSTN—such as making the network aware of the application that it supports—are added to the new network. The resulting convergence of this network has become known as an "integrated digital network" or IDN. An IDN can provide simultaneous and integrated transmission of voice, data, and video to multiple network users—over the existing network access types that are available today, and also add value of application-awareness that has not been present in most modern data networks.

DETAILED DESCRIPTION OF EMBODIMENTS OF THE INVENTION

The present invention embodies a system and method for providing telecommunications services through an integrated digital network. Furthermore, the present invention embodies a system and method for configuring an existing telecommunications network into an integrated digital network. The present invention also embodies a system and method for reusing existing network components and converting a core network into an edge-based node network. Finally, the present invention embodies a system and method for configuring a telecommunications network for delivering service applications to network users.

Figure 1:
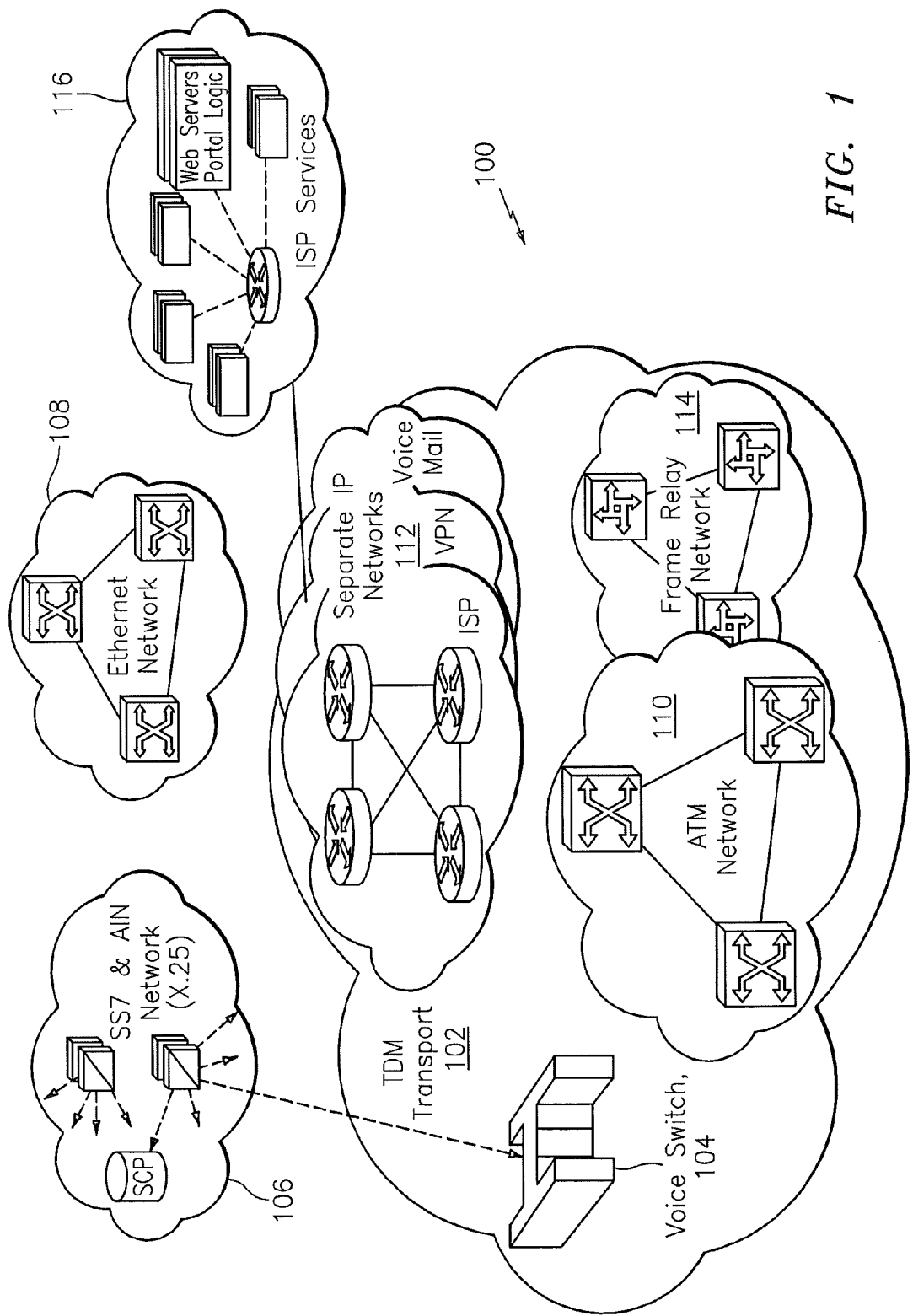
FIG. 1 is a functional block diagram of a set of conventional telecommunications networks typically deployed by a telecommunications service provider.

Particular embodiments of the present invention will now be described in greater detail with reference to the drawings. FIG. 1 illustrates a functional block diagram of a conventional telecommunications service provider's networks. A conventional telecommunications network system 100 has no single core. The conventional telecommunications network system 100 shown is based on one or more disparate networks. For example, a TDM/SONET transport system or network 102 is typically a common data transport infrastructure that supports various networks. Almost universally, the TDM/SONET transport system 102 is used to interconnect a set of TDM switches 104 that provide a connection-oriented TDM network capability. This TDM/SONET transport system 102 then supports PSTN telephony and Private Line applications. Users would typically access the TDM/SONET transport system 102 and its applications using dedicated access lines and specific-purpose equipment, like phones, faxes, and modems.

Other communications applications or services may be available or accessible by the user through associated networks. For example, associated networks can include a SS7 & AIN network (X.25) 106, Ethernet Network 108, ATM Network 110, or one or more separate IP networks 112. These associated networks may or may not leverage the TDM/SONET transport system 102 as shown. Specifically, one commonly used network is Frame Relay 114. A user communicating via Frame Relay 114 may communicate with another user connected to the Frame Relay network 114. Finally, conventional networks 102-114 may access a variety of ISP services 116 as shown.

Figure 2:
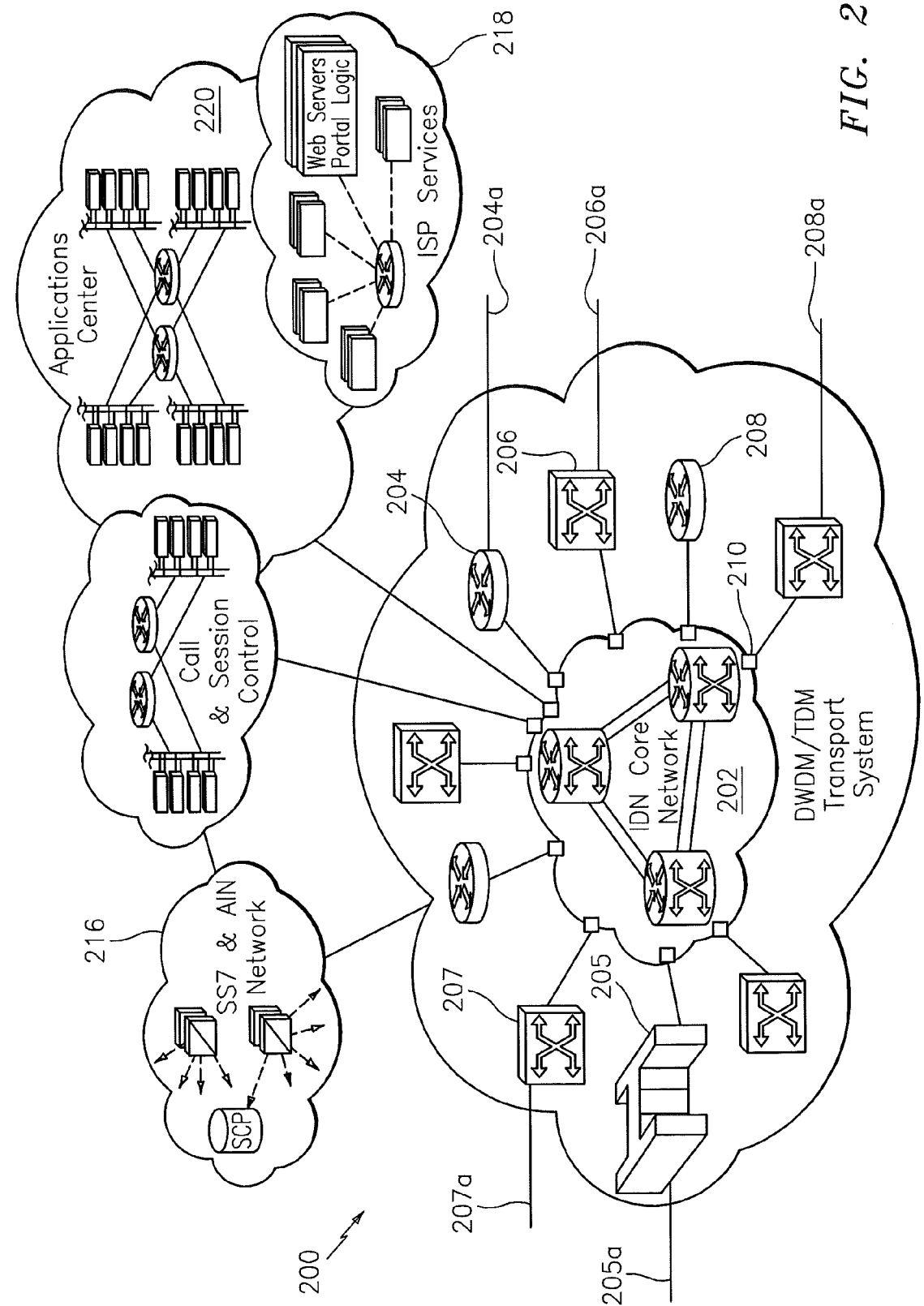
FIG. 2 illustrates a functional block diagram of a system according to an exemplary embodiment of the present invention.
Figure 3:
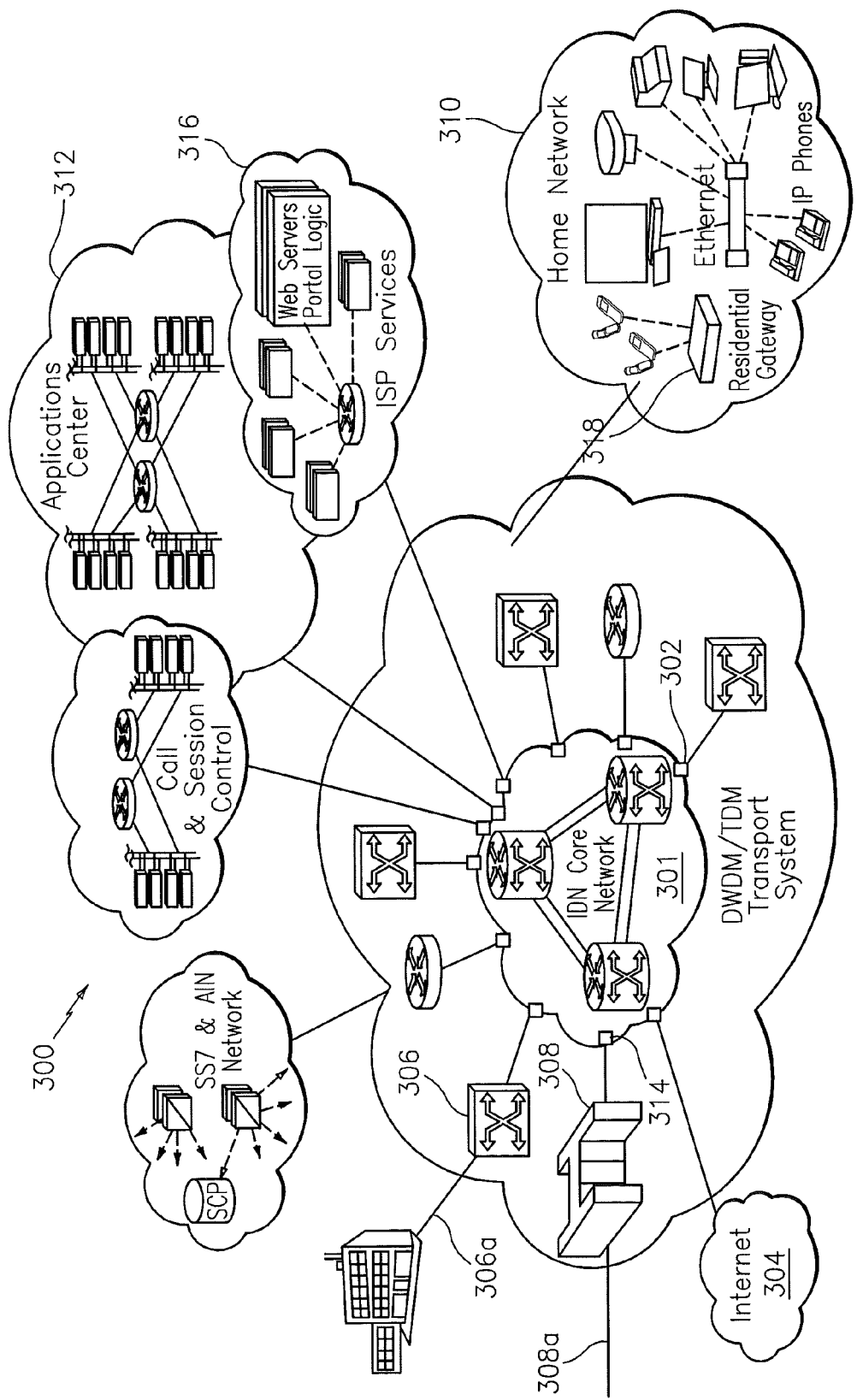
FIG. 3 illustrates another functional block diagram of a system according to an exemplary embodiment of the present invention.

FIGS. 2 and 3 are functional block diagrams of exemplary embodiments of the present invention. Note that when viewed together and in conjunction with FIG. 1, these diagrams depict an evolution from one embodiment to the another embodiment of the present invention as different network parts are deployed in the context of a conventional telecommunications network system as shown in FIG. 1.

FIG. 2 illustrates an embodiment of the present invention including an integrated digital network system 200. The integrated digital network system 200 has a common IDN core 202 that supports associated multiple (legacy) networks such as IP 204, frame relay 206, and ATM 208. The integrated digital network system 200 is configured to support the simultaneous transmission and network characteristics of the disparate networks and user applications communicating with the integrated digital network system 200. The integrated digital network 200 can also provide quality of service, content-aware service, and secure communications capabilities for all transmissions to a user communicating with the integrated digital network system 200. Typically, a gateway 210 connects the associated multiple networks 204-208 and provides cross-communications between the associated multiple networks 204-208. The gateway 210 can be configured to coordinate communications between associated multiple networks 204-208 as well as resolve any differences in protocols or communications between associated multiple networks 204-208, thus facilitating the exchange of data, voice, and/or video signals from the integrated digital network system 200 to a user.

A gateway 210 includes both the native QoS, security, and network characteristics of the access network type (like Frame Relay) as well as the QoS, Security, and network characteristics of the IDN, which are focused on applications' requirements (like predictable latency for voice). For example, the gateway 210 has the ability to coordinate the delivery of communications through an external system that provides a management and billing function for applying network resources throughout the integrated digital network system 200. MultiProtocol Label Switching (MPLS) may be a network technology for a common IDN core 202, so that a gateway 210 could typically perform the functions that a MPLS edge router would perform. These functions can include the ability to provide either connectionless or connection oriented packet forwarding, as well as the hybrid function of providing packet-by-packet QoS to a connection-oriented service. Such gateways exist today in the form of MPLS Label Edge Routers (LERs). Beyond these basic capabilities, the gateway can also map QoS and network characteristics from legacy network types to the MPLS core. An example of this would be to map ATM CBR (Constant Bit Rate) and UBR (Unspecified Bit Rate) services to MPLS QoS classes tailored to support the ATM service. These capabilities are being developed, currently, in standards that define support of legacy networks over MPLS, like the IETF Martini-Kompella drafts. One embodiment of a gateway 210 can allow the gateway 210 to take direction and support AAA services through a call and connection management system. This type of management system can use SIP (Session Initiation Protocol) in order to allow establishment of application communications sessions, like phone calls, or video on demand. While a LER was provided as one example for a gateway for Frame Relay service, a Voice over Packet gateway may share these essential characteristics, but be useful for providing a tandem voice service through the IDN core, rather than a Frame Relay service.

The common IDN core 202 utilizes the QoS and security aspects of the gateways, but need not provide the interwork functions needed to connect to the legacy network and service types. The common IDN core 202, because it carries traffic from disparate network types, can scale to support large amounts of data throughput, and can provide economical transport both for the cases where that transport needs to be highly reliable and where it needs to be very inexpensive— attributes that are often mutually exclusive. Some MPLS switch/routers can satisfy these requirements.

Furthermore, each of these associated multiple networks 204-208 has associated consumer network services such as IP services 204*a*, frame services 206*a*, and ATM services 208*a*. These services 204*a*-208*a* are accessible by users connected to each associated multiple network 204-208, or otherwise connected to the integrated digital network system 200.

Other services may be associated with the integrated digital network system 200 or associated multiple network 204-208, or otherwise may be accessible by the system 200. Examples of these services include consumer services, ADSL, SS7 & AIN 216, ISP services such as BellSouth.net 218, and applications centers such as E-Center 220.

In this example, use of an integrated VoIP gateway with RAS and PRI interface capabilities can maximize PSTN gateway efficiency by centralizing many of the adaptation functions. Furthermore, core DCXS functions can be supplemented with IDN core switches and transport can be grown as a pure IDN function.

FIG. 3 illustrates another functional block diagram of an embodiment of the present invention. In this embodiment, an integrated digital network system 300 is shown with a core 301 and a service gateway 302. The service gateway 302 interconnects with one or more networks such as the Internet 304, corporate networks 306, a public switched telephone network (PSTN) 308, a home network 310, and a service and application hosting center 312. The service gateway 302 is configured to connect across existing network components to provide cross-communications between the multiple networks.

Each associated network 304-312 can have a dedicated gateway, server, or network access point. For example, the PSTN 308 can have a VoIP (Voice over Internet Protocol) gateway 314. The Internet 304 can have an alternate non-hosted ISP (Internet Service Provider) 316 or host server providing access to the Internet 304. The home network 310 may have a residential gateway 318.

Figure 4:
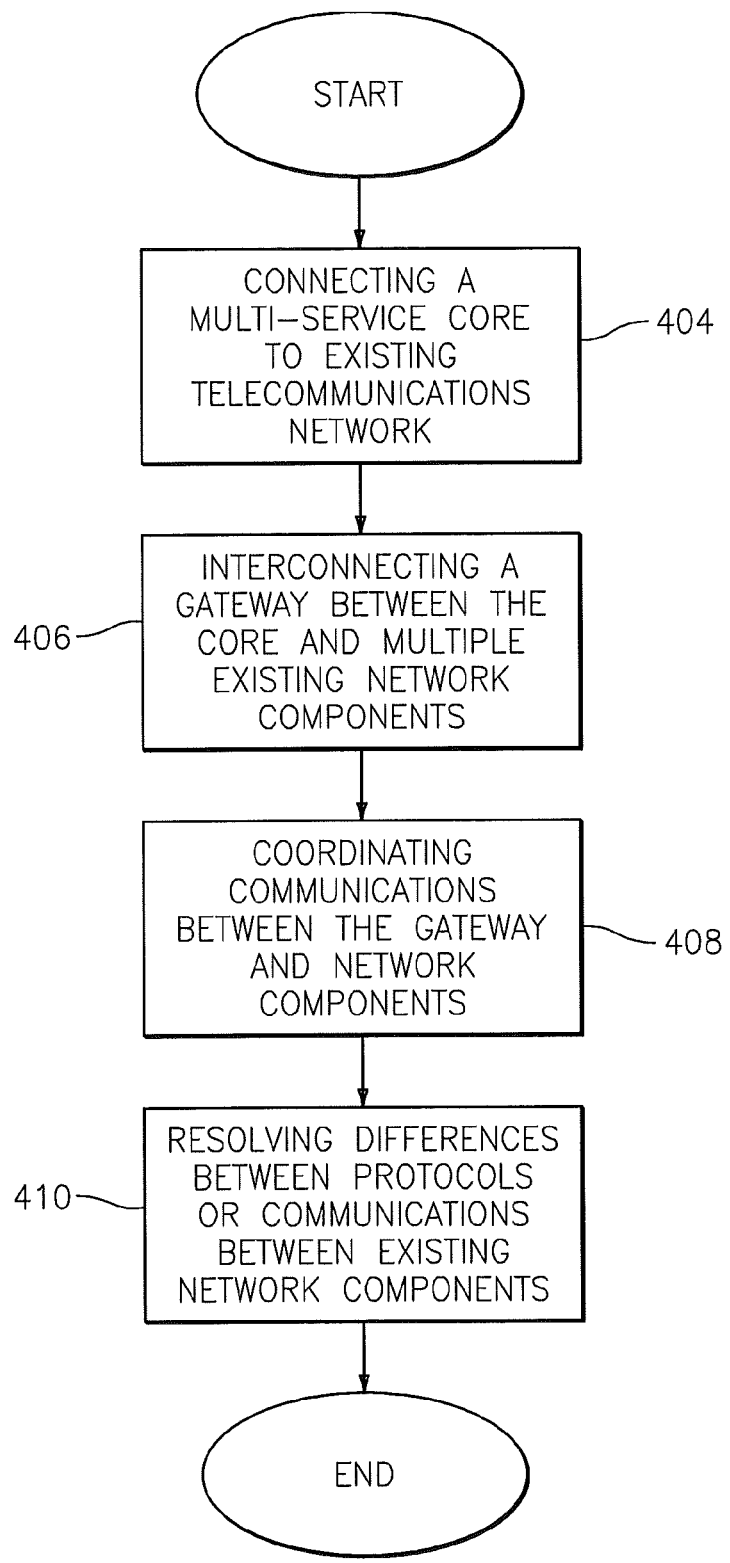
FIG. 4 illustrates a flowchart diagram of an exemplary method according to an embodiment of the present invention.

FIG. 4 illustrates a flowchart diagram of an exemplary method according to an embodiment of the present invention. The method 400 begins at 402.

402 is followed by 404, in which a multi-service core connects to existing telecommunications networks.

404 is followed by 406, in which a gateway is interconnected between the multi-service core and multiple existing network components.

406 is followed by 408, in which communications between the gateway and existing network components is coordinated.

408 is followed by 410, in which differences between protocols or communications between existing network components is resolved.

410 is followed by 412, in which the method 400 ends.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for converging multiple telecommunications networks, each including network components, into an integrated digital network such that the integrated digital network can provide common network service applications to multiple users, comprising:
   connecting a multi-service core to telecommunications networks, wherein the core can communicate with network components;
   interconnecting a gateway between the multi-service core and multiple network components, wherein the gateway is configured to share multiple service aspects with each network component and to utilize multiple transport protocols to communicate with different network components, the gateway providing quality of service (QoS) enabled communications by mapping legacy network QoS services to the multi-service core QoS services including mapping network characteristics from legacy network types to an MPLS core, the mapping including mapping a bit rate service class for a first type of network service to QoS classes in a second type of network service;
   coordinating communications between the gateway and network components; and
   resolving differences between protocols or communications between network components.

2. The method of claim 1, wherein the service aspects include security.

3. The method of claim 1, wherein the gateway is a MPLS label edge router.

4. The method of claim 1, wherein the gateway can coordinate the delivery of communications that provides a management and billing function for applying network resources throughout the integrated digital network.

5. The method of claim 1, wherein the gateway is a Voice over Packet gateway.

6. The method of claim 1, wherein the core comprises a series of MPLS switches and routers.

7. The method of claim 1 wherein the common network service applications include voice.

8. The method of claim 1 wherein the common network service applications include data.

9. The method of claim 1 wherein the common network service applications include video.

10. The method of claim 1, wherein mapping legacy network QoS services to the multi-service core QoS services includes mapping ATM Constant Bit Rate and Unspecified Bit Rate services to MPLS QoS classes tailored to support the ATM service.

11. A system for providing network services to multiple network users through an integrated digital network comprising multiple telecommunications networks, each including network components, comprising:
   a multi-service core with shared service aspects of an associated gateway;
   at least one service gateway interconnected to core network components such that one or more telecommunications networks can exchange communications, wherein the gateway is configured to
      provide shared service aspects with each telecommunication network;
      utilize multiple transport protocols to communicate with network components of different telecommunications networks;
      coordinate communications between network components of different telecommunications networks;
      provide quality of service (QoS) enabled communications by mapping legacy network QoS services to the multi-service core QoS services, including mapping network characteristics from legacy network types to an MPLS core, the mapping including mapping a bit rate service class for a first type of network service to QoS classes in a second type of network service; and
      resolve differences between protocols or communications between network components of different telecommunications networks.

12. The system of claim 11, wherein the service aspects include security.

13. The system of claim 11, wherein the gateway is a MPLS label edge router.

14. The system of claim 11, wherein the gateway can coordinate the delivery of communications that provides a management and billing function for applying network resources throughout the integrated digital network.

15. The system of claim 11, wherein the gateway is a Voice over Packet gateway.

16. The system of claim 11, wherein the core comprises a series of MPLS switches and routers.

17. The system of claim 11 wherein the network services include voice.

18. The system of claim 11 wherein the network services include data.

19. The system of claim 11 wherein the network services include video.

20. The system of claim 11, wherein mapping legacy network QoS services to the multi-service core QoS services includes mapping ATM Constant Bit Rate and Unspecified Bit Rate services to MPLS QoS classes tailored to support the ATM service.

* * * * *